(12) United States Patent
Robinson et al.

(10) Patent No.: US 11,585,666 B2
(45) Date of Patent: Feb. 21, 2023

(54) USING PARTITIONED CONTRACTION HIERARCHIES TO DETERMINE A ROUTE FROM AN ORIGINATION POINT TO A DESTINATION POINT

(71) Applicant: Verizon Patent and Licensing Inc., Arlington, VA (US)

(72) Inventors: Nathan M. Robinson, Christchurch (NZ); Mykhaylo Tyuryutikov, Christchurch (NZ); Jefferson Ray Tan Hidayat, Christchurch (NZ)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 373 days.

(21) Appl. No.: 16/373,219

(22) Filed: Apr. 2, 2019

(65) Prior Publication Data
US 2020/0318980 A1    Oct. 8, 2020

(51) Int. Cl.
*G01C 21/34* (2006.01)
*G06F 16/27* (2019.01)
*H04L 67/10* (2022.01)

(52) U.S. Cl.
CPC ....... *G01C 21/3446* (2013.01); *G06F 16/278* (2019.01); *H04L 67/10* (2013.01)

(58) Field of Classification Search
CPC .. Y10S 707/92; Y10S 116/43; G01C 21/3889
See application file for complete search history.

(56) References Cited

U.S. PATENT DOCUMENTS

| | | | | |
|---|---|---|---|---|
| 8,670,937 | B2* | 3/2014 | Shinagawa | G06N 5/003 701/533 |
| 8,824,337 | B1* | 9/2014 | Geisberger | G01C 21/3446 370/255 |
| 2007/0129885 | A1* | 6/2007 | Wellmann | G01C 21/3446 701/428 |
| 2010/0332132 | A1* | 12/2010 | Okude | G08G 1/096816 701/414 |

(Continued)

OTHER PUBLICATIONS

Theurer, Incremental Updates of Contraction Hierarchies for Road NetworK Routing, May 2013, University of Dublin (Year: 2013).*
Geisberger, Advanced Route Planning in Transportation Networks, Feb. 4, 2011, Fakultät für Informatik des Karlsruher Instituts für Technologie (Year: 2011).*

(Continued)

*Primary Examiner* — Christian Chace
*Assistant Examiner* — Scott R Jagolinzer

(57) ABSTRACT

A route planning platform can identify a plurality of nodes interconnected by a plurality of paths in a road network, can divide the road network into a plurality of partitions, and can generate a respective contraction hierarchy for each partition of the plurality of partitions. The route planning platform can generate, based on the contraction hierarchies of the plurality of partitions, an overlay network and can generate a contraction hierarchy for the overlay network. The route planning platform can obtain information relating to an origination point and a destination point associated with the road network and can identify a first partition associated with the origination point and a second partition associated with the destination point. The route planning platform can determine a route from the origination point to the destination point based on the respective contraction hierarchies of the first partition, the second partition, and the overlay network.

20 Claims, 9 Drawing Sheets

(56) References Cited

U.S. PATENT DOCUMENTS

| | | | | |
|---|---|---|---|---|
| 2011/0113155 A1* | 5/2011 | Kuznetsov | ......... | G01C 21/3446 709/241 |
| 2012/0155511 A1* | 6/2012 | Shaffer | ......... | H04B 1/713 375/133 |
| 2012/0283948 A1* | 11/2012 | Demiryurek | ......... | G01C 21/3492 701/533 |
| 2013/0132369 A1* | 5/2013 | Delling | ......... | G01C 21/3446 707/716 |
| 2014/0250140 A1* | 9/2014 | Guzenda | ......... | G06F 16/28 707/758 |
| 2014/0278094 A1* | 9/2014 | Stracke, Jr. | ......... | G01C 21/3889 701/533 |
| 2016/0245657 A1* | 8/2016 | Dorum | ......... | G01C 21/32 |
| 2020/0072621 A1* | 3/2020 | Lee | ......... | G01C 21/34 |
| 2020/0264002 A1* | 8/2020 | Gotsman | ......... | G06F 16/9027 |

OTHER PUBLICATIONS

Dibberlt et. al., Customizable Contraction Hierarchies, Apr. 2016, ACM Journal of Experimental Algorithmics, vol. 21, No. 1, Article 1.5 (Year: 2016).*

Aljubayrin, Algorithms for Advanced Path Optimization Problems, Oct. 2016, University of Melbourne (Year: 2016).*

Vetter, Parallel Time-Dependent Contraction Hierarchies, Jul. 13, 2009, Universifat Karlsruhe (Year: 2009).*

Delling et al., "Customizable Route Planning", 2011, 12 pages, https://www.semanticscholar.org/paper/Customizable-Route-Planning-Delling-Goldberg/41f3315e0adcc39f9197df8d8b22ff98af3f40a6.

Geisberger et al., "Contraction Hierarchies: Faster and Simpler Hierarchical Routing in Road Networks.", 2008, 15 pages., https://link.springer.com/chapter/10.1007/978-3-540-68552-4_24.

Karypis et al., "A Fast and High Quality Multilevel Scheme for Partitioning Irregular Graphs", 28 pages, Jul. 2008, https://epubs.siam.org/doi/abs/10.1137/S1064827595287997.

* cited by examiner

USING PARTITIONED CONTRACTION HIERARCHIES TO DETERMINE A ROUTE FROM AN ORIGINATION POINT TO A DESTINATION POINT

BACKGROUND

A device can use a contraction hierarchy method to determine a shortest route between an origination point and a destination point in a road network. During a preprocessing stage, the device creates a contraction hierarchy of the road network. During a query stage, the device searches the contracted version of the road network to determine the shortest route.

DETAILED DESCRIPTION OF PREFERRED EMBODIMENTS

Figure 1A:
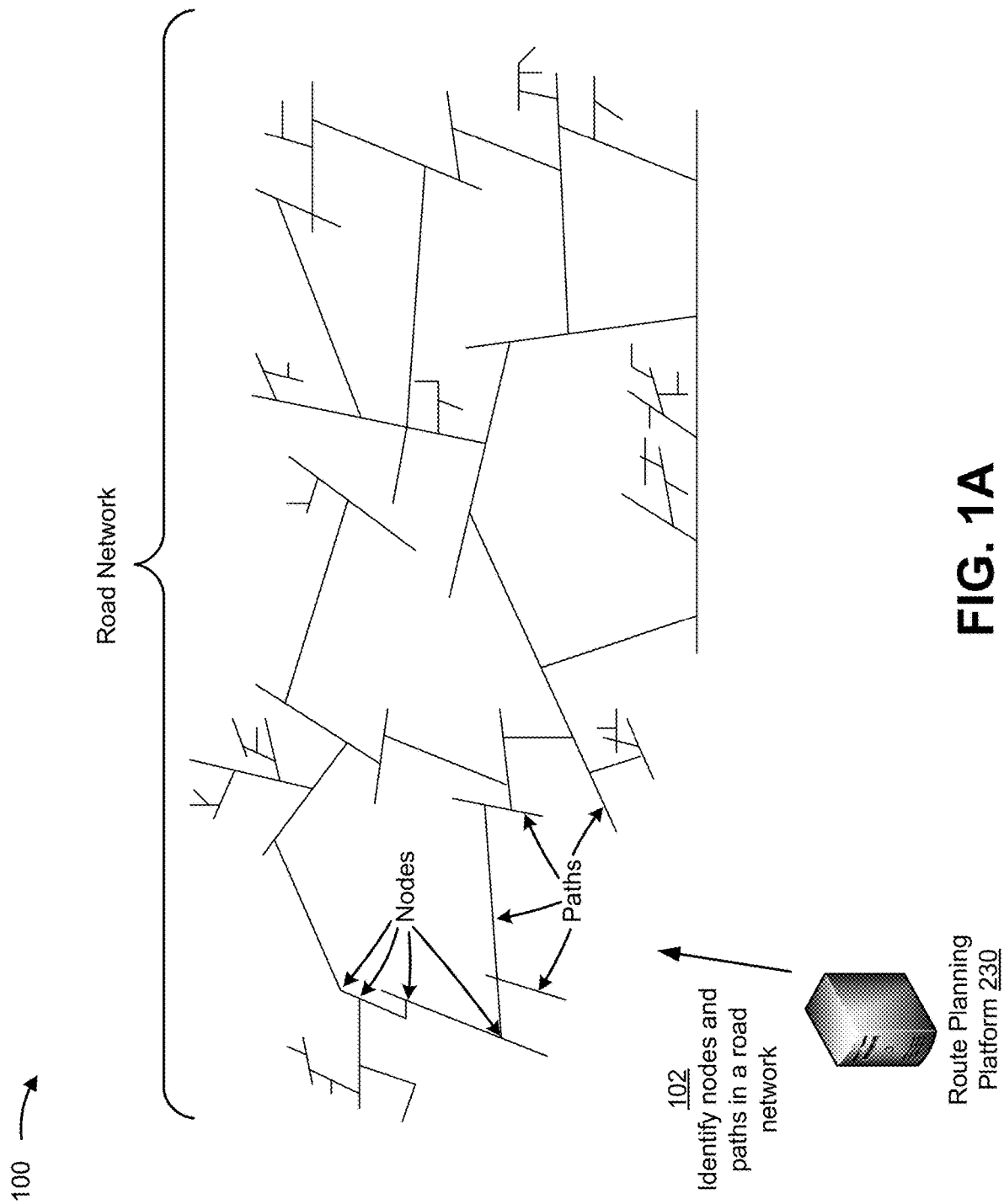
FIGS. 1A-1F are diagrams of one or more example implementations described herein.

The following detailed description of example implementations refers to the accompanying drawings. The same reference numbers in different drawings can identify the same or similar elements.

In some instances, a device uses a contraction hierarchy method to determine an optimal route (e.g., a shortest distance route, a shortest travel time route, a route that avoids highways and/or residential areas, a route without tolls, and/or the like) between an origination point and a destination point in a road network. To do so, the device enters a preprocessing stage, where the device creates a contraction hierarchy of the road network. After the preprocessing stage, the device enters a query stage, where the device obtains information about the origination point and the destination point and searches the contraction hierarchy of the road network to determine the optimal route between the origination point and the destination point. However, for large road networks (e.g., continent-sized road networks), the device can use a tremendous amount of resources (e.g., processing resources, memory resources, power resources, and/or the like) of the device to create the contraction hierarchy of the road network during the preprocessing stage. Further, the preprocessing stage can require a large amount of processing time (e.g., days, weeks, and/or the like), which limits the ability of the device to update the contraction hierarchy of the road network to accommodate real-world traffic conditions, such as road closures, detours, accidents, and/or the like.

Some implementations described herein provide a route planning platform that, during a preprocessing stage, divides a road network into a plurality of partitions and generates a respective contraction hierarchy for each partition of the plurality of partitions. In some implementations, the route planning platform generates, based on the contraction hierarchies of the plurality of partitions, an overlay network and generates a contraction hierarchy for the overlay network. In some implementations, during a query stage, the route planning platform obtains information relating to an origination point and a destination point associated with the road network and identifies a first partition associated with the origination point and a second partition associated with the destination point. In some implementations, the route planning platform determines a route from the origination point to the destination point based on the respective contraction hierarchies of the first partition, the second partition, and the overlay network.

In this way, a contraction hierarchy for a single partition can be updated much more quickly, as compared to a contraction hierarchy for the entire road network, in order to respond to changes to the road network within the partition, which improves system efficiency and conserves resources (e.g., processing resources, memory resources, power resources, and/or the like) of the route planning platform. For example, an amount of data associated with a partition is significantly less than the amount of data associated with the entire road network, which reduces an overall amount of time and processing needed to update the contraction hierarchy for the partition as compared to updating a contraction hierarchy for the entire road network.

Moreover, the route planning platform requires less time to create the contraction hierarchies for the plurality of partitions during the preprocessing stage because the respective amount of data associated with each partition is smaller than the amount of data associated with the entire road network, which reduces an overall amount of time needed to create contraction hierarchies for the plurality of partitions as compared to creating a contraction hierarchy for the entire road network, and because the contraction hierarchies for the plurality of partitions can be created in parallel. Further, the route planning platform takes less time during the query stage to find a route from the origination point to the destination point because the route planning platform is able to search, in parallel, multiple potential routes through respective contraction hierarchies of multiple partitions and the overlay network.

FIGS. 1A-1F are diagrams of one or more example implementations 100 described herein. As shown in FIGS. 1A-1F, example implementation(s) 100 can include a route planning platform (shown in FIGS. 1A-1F as route planning platform 230). The route planning platform can communicate with a client device, a network storage device, and/or the like. The route planning platform can be a computing device, a server, a cloud computing device, and/or the like. The client device can be a communication and/or computing device, such as a mobile phone, a smartphone, a laptop computer, a tablet computer, and/or the like. The network storage device can be a server device, a device that stores a data structure, and/or the like. In some implementations, the route planning platform, the client device, and/or the network storage device can be connected via a network, such as a wired network (e.g., the Internet or another data network), a wireless network (e.g., a wireless local area network, a wireless wide area network, a cellular network, etc.), and/or the like.

Some example implementations described herein concern a single route planning platform communicating with a single client device and/or a single network storage device. In some implementations, a plurality of route planning platforms can communicate with one or more client devices and/or network storage devices. In some implementations, one or more functions of the route planning platform can be performed by the client device and/or the network storage device instead of, or in addition to, being performed by the route planning platform. In some implementations, one or more functions of the client device and/or one or more functions of the network storage device can be performed by the route planning platform instead of, or in addition to, being performed by the client device and/or the network storage device.

Figure 1B:
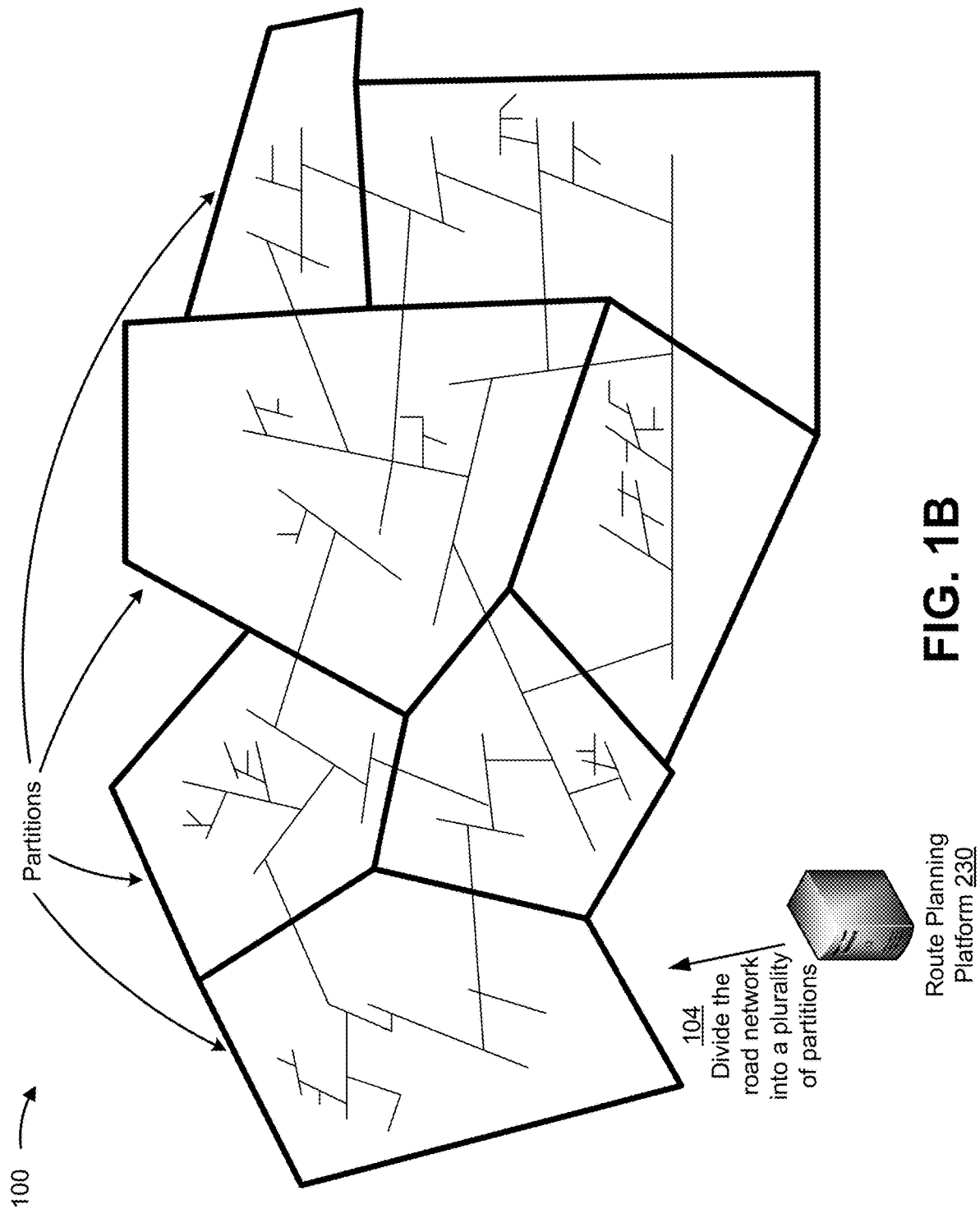
Figure 1C:
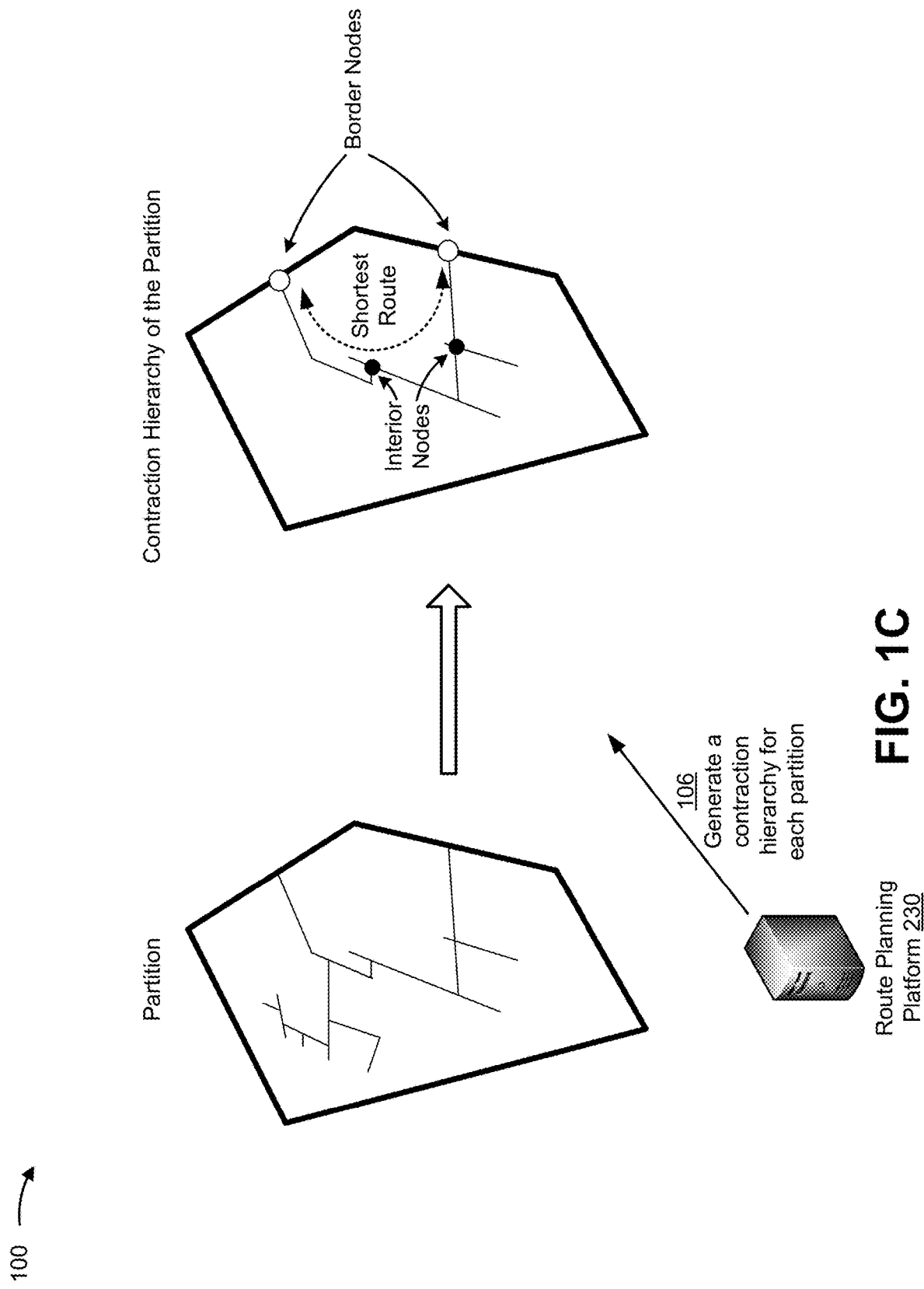
Figure 1D:
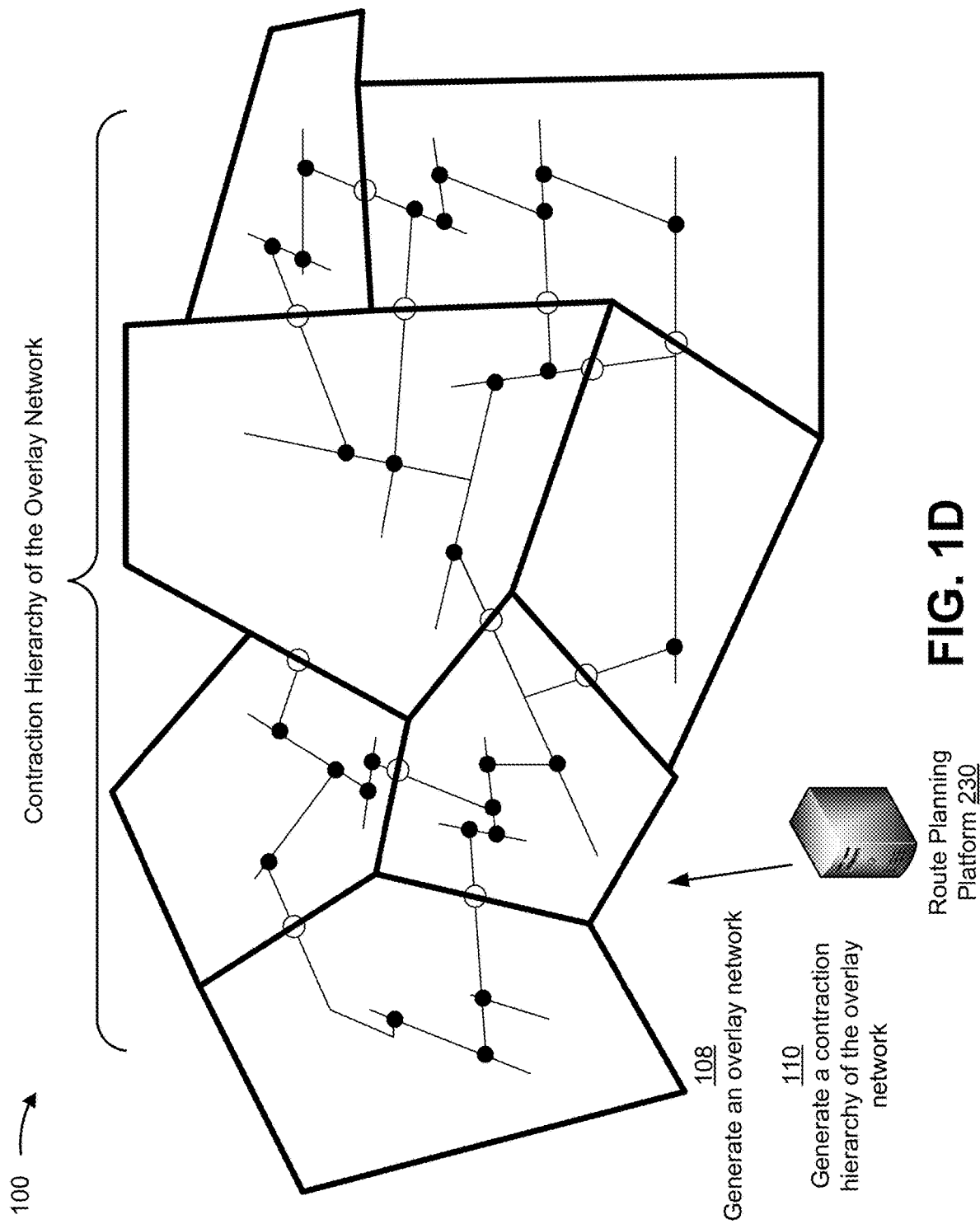
Figure 1E:
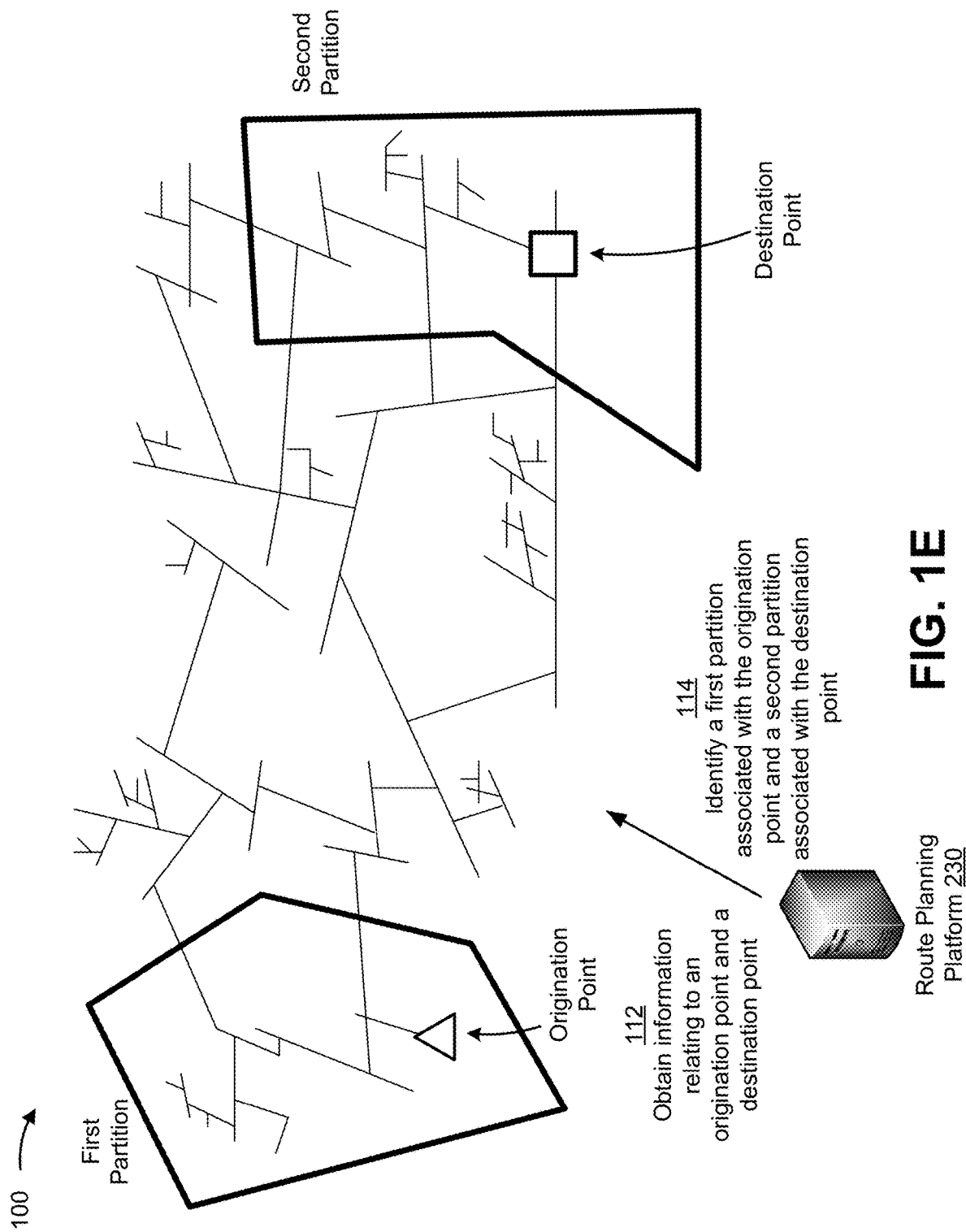
Figure 1F:
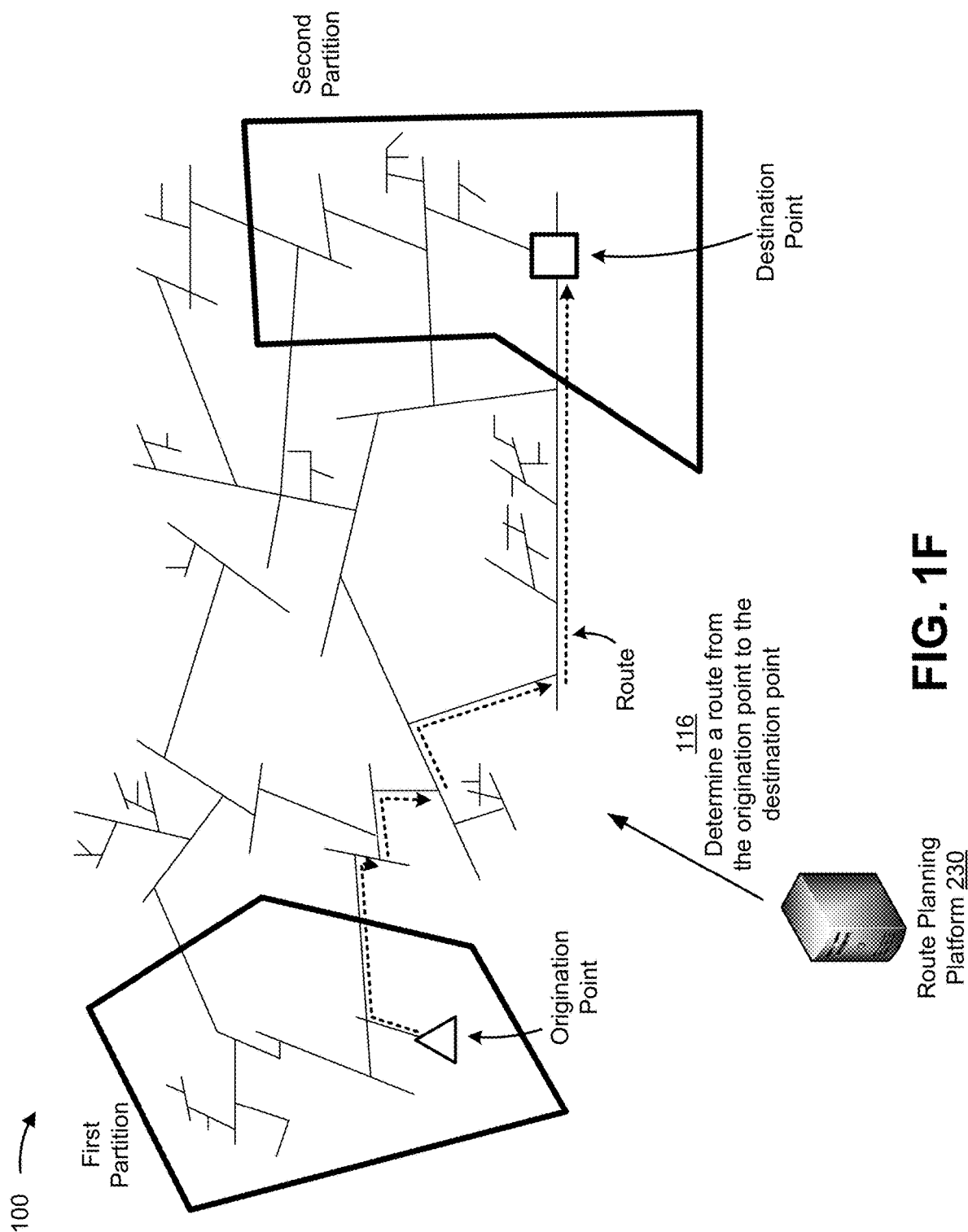

FIGS. 1A-1F show one or more functions that can be performed by the route planning platform to determine a route from an origination point to a destination point in a road network. FIGS. 1A-1D show one or more functions that can be performed by the route planning platform to process information related to the road network during a preprocessing stage. FIGS. 1E-1F show one or more functions that can be performed by the route planning platform to determine the route during a query stage.

During the preprocessing stage, as shown in FIG. 1A, the route planning platform can obtain information related to a road network. The road network can include a plurality of nodes interconnected by a plurality of paths. A path can represent a road, a street, a highway, and/or the like of the road network. A node can represent an intersection point of two or more paths (e.g., a point where a path crosses a different path). As shown by reference number 102, the route planning platform can identify the plurality of nodes and the plurality of paths in the road network. For example, the route planning platform can process the information about the road network to identify the plurality of nodes and the plurality of paths in the road network.

As shown in FIG. 1B and by reference number 104, the route planning platform can divide the road network into a plurality of partitions (e.g., using a graph partitioning algorithm, such as METIS). A partition can include an area of the road network (e.g., an area of the road network that is smaller than the road network) and can include a border around the area of the road network that defines one or more edges of the partition. The partition can include one or more nodes of the road network and one or more paths of the road network. For example, the partition can include one or more nodes that are located within the area of the road network and one or more paths that are located within the area of the road network (e.g., any path that is inside and/or crosses through the area of the road network).

In some implementations, the route planning platform can divide the road network into the plurality of partitions to minimize a total number of edges associated with the plurality of partitions and/or to minimize a total number of cuts needed to create the edges associated with the plurality of partitions. Additionally, or alternatively, the route planning platform can divide the road network into the plurality of partitions such that each partition is of a similar size (e.g., each partition includes the same or a similar number of nodes and/or paths). For example, the route planning platform can determine a particular number of nodes to include in each partition and can divide the road network into the plurality of partitions such that each partition includes a number of nodes that matches the particular number of nodes within a threshold amount (e.g., within a tolerance amount, such as 3% of the particular number of nodes). Minimizing the total number of edges of the plurality of partitions and/or creating similarly-sized partitions can reduce an amount of resources (e.g., processing resources, memory resources, power resources, and/or the like) used by the route planning platform to divide the road network into the plurality of partitions and/or perform one or more other functions described herein.

As shown in FIG. 1C and by reference number 106, the route planning platform can generate a respective contraction hierarchy for each partition of the plurality of partitions. In some implementations, as shown in FIG. 1C, the route planning platform can identify a border associated with a partition and can identify a group of paths and/or a group of nodes that are included in the partition and generate a contraction hierarchy for the partition.

For example, the route planning platform can determine a respective priority value of each node of the group of nodes (e.g., using a heuristic, such as an edge difference heuristic) and traverse (e.g., search using a graph traversal technique, a graph searching technique, a tree traversal technique, a tree searching technique, and/or the like) the group of nodes based on the priority values of the group of nodes (e.g., traverse the group of nodes from lowest level priority value to highest level priority value) to generate the contraction hierarchy. For each iteration of the traversal, the route planning platform can remove a node from the contraction hierarchy and add one or more shortcuts that represent one or more shortest routes between the remaining nodes of the contraction hierarchy.

Additionally, or alternatively, the route planning platform can identify and/or generate one or more border nodes (e.g., shown as white circles in FIG. 1C), where a border node represents a point at which a path intersects with the border (e.g., a point at which a path crosses the border). In some implementations, the route planning platform can calculate a respective shortest route (e.g. a shortest distance route, a shortest travel time route, and/or the like) between the one or more border nodes. For example, the route planning platform can determine a shortest route between a first border node and a second border node and a different shortest route between the first border node and a third border node. In some implementations, the route planning platform can identify a set of paths (e.g., of the group of paths included in the partition) that are included in the shortest routes between the one or more border nodes. The route planning platform can represent the set of paths with one or more shortcuts (e.g., one or more routes through the set of paths, such as one or more detours through less important roads).

In some implementations, the route planning platform can identify a set of nodes (e.g., of the group of nodes included in the partition) that are located along the shortest routes between the one or more border nodes, and can determine a respective priority value of each node of the set of nodes. For example, the route planning platform can determine a priority value of a node, of the set of nodes, based on how many paths and/or shortcuts the node is associated with (e.g., how many paths and/or shortcuts intersect at the node). In some implementations, the route planning platform can identify a subset of nodes (e.g., interior nodes, shown in FIG. 1C as black circles), of the set of nodes, that are each connected to a threshold number of paths and/or shortcuts (e.g., a threshold number of paths and/or shortcuts intersect at each node of the subset of nodes). For example, each node of the subset of nodes can be connected to at least three paths and/or shortcuts. The route planning platform can cause the one or more border nodes and the subset of nodes to be associated with a highest priority value for the partition (e.g., have a maximum priority value such that each node of the border nodes and the subset of nodes has a priority value that is higher than any other node of the group of nodes included in the partition). Causing the subset of nodes to be associated with the highest priority value for the partition ensures that additional shortcuts are not needed to represent shortest routes between the one or more border nodes, which reduces an amount of time to create the contraction hierarchy of the partition and/or to search the contraction hierarchy for a route through the contraction hierarchy.

In some implementations, the route planning platform and/or the network storage device can store the contraction hierarchy of the partition. In some implementations, the route planning platform can remove, from the contraction hierarchy of the partition, one or more paths of the group of paths and/or one or more nodes of the group of nodes that are not associated with the shortest routes between the one or more border nodes. In this way, the contraction hierarchy of the partition can include just the paths, shortcuts, interior nodes, and/or border nodes that are associated with the shortest routes between the one or more border nodes, which can reduce an amount of resources (e.g., memory resources) used by the route planning platform and/or the network storage device to store the contraction hierarchy of the partition.

As shown in FIG. 1D and by reference number 108, the route planning platform can generate an overlay network. The route planning platform can generate the overlay network by combining the plurality of partitions. Additionally, or alternatively, the route planning platform can generate the overlay network by combining the contraction hierarchies of the plurality of partitions. For example, the overlay network can include just the paths, shortcuts, interior nodes, and/or border nodes that are associated with the shortest routes between border nodes of the plurality of partitions. In this way, the route planning platform excludes paths and nodes from the overlay network that are not useful for finding a route between partitions. Further, this reduces an amount of resources (e.g., memory resources) used by the route planning platform and/or the network storage device to store the overlay network.

As shown by reference number 110, the route planning platform can generate a contraction hierarchy of the overlay network. For example, the route planning platform can identify one or more nodes and/or one or more paths of the overlay network and can generate one or more shortcuts to represent shortest paths between the one or more nodes. Additionally, or alternatively, the route planning platform can determine a respective priority value of each node of the one or more nodes of the overlay network. For example, the route planning platform can determine a priority value of a node based on how many paths and/or shortcuts the node is associated with (e.g., how many paths and/or shortcuts intersect at the node). Where the overlay network is a combination of the contraction hierarchies of the plurality of partitions, the contraction hierarchy of the overlay network can include one or more paths, shortcuts, and/or nodes of the overlay network that are associated with the paths, shortcuts, interior nodes, and/or border nodes that are associated with the shortest routes between border nodes of the plurality of partitions. This can reduce an amount of resources (e.g., memory resources) used by the route planning platform and/or the network storage device to store the contraction hierarchy of the overlay network.

After the preprocessing stage described in association with FIGS. 1A-1D, the route planning platform can enter the query stage to generate a route between an origination point and a destination point in the road network. For example, as shown in FIG. 1E and by reference number 112, the route planning platform can obtain information relating to the origination point and the destination point. In some implementations, the route planning platform can obtain the information relating to the origination point and the destination point from the client device. For example, a user can interact with a user interface of the client device to indicate the origination point and/or the destination point. The client device can send a message to the route planning platform that indicates the origination point and/or the destination point. In some implementations, the route planning platform can obtain the information relating to the origination point and the destination point from the network storage device. For example, the route planning platform can query the network storage device for the origination point and/or the destination point.

As shown by reference number 114, the route planning platform can identify a first partition associated with the origination point and a second partition associated with the destination point. For example, the route planning platform can determine the first partition based on location information of the origination point (e.g., a latitude and/or longitude, an address, a zip code, and/or the like, of the origination point). The route planning platform can determine the second partition based on location information of the destination point in a similar manner.

As shown in FIG. 1F and by reference number 116, the route planning platform can determine a route from the origination point to the destination point. The route can be an optimal route from the origination point to the destination point, such as a shortest distance route, a shortest travel time route, a route that avoids highways and/or residential areas, a route without tolls, and/or the like. In some implementations, the route planning platform can identify a first set of nodes of the contraction hierarchy of the first partition (e.g., the interior nodes and/or the border nodes that are associated with the shortest routes between the border nodes of the contraction hierarchy of the first partition), a second set of nodes of the contraction hierarchy of the second partition (e.g., the interior nodes and/or the border nodes that are associated with the shortest routes between the border nodes of the contraction hierarchy of the second partition), and/or a third set of nodes of the contraction hierarchy of the overlay network (e.g., the nodes of the contraction hierarchy of the overlay network) to facilitate determining the route. In some implementations, the third set of nodes includes one or more nodes of the first set of nodes and/or one or more nodes of the second set of nodes. For example, a node of the first set of nodes can be a border node or interior node of the contraction hierarchy of the first partition that is also in the contraction hierarchy of the overlay network (e.g., the third set of nodes). In an additional example, a node of the second set of nodes can be a border node or interior node of the contraction hierarchy of the second partition that is also in the contraction hierarchy of the overlay network (e.g., the third set of nodes).

The route planning platform can traverse (e.g., search using a graph traversal technique, a graph searching technique, a tree traversal technique, a tree searching technique, and/or the like), from the origination point, one or more nodes of the first set of nodes and/or the third set of nodes based on a respective priority value associated with each node of the first set of nodes and/or the third set of nodes. For example, the route planning platform can determine a subset of nodes of the first set of nodes that are connected to the origination point by one or more paths and/or shortcuts. The route planning platform can determine which nodes of the subset of nodes have respective priority values that are higher than the priority value of the origination point. Further, the route planning platform can, for each node of those higher priority nodes, determine a respective additional subset of nodes of the first set of nodes that are connected to the node and that have a higher priority value than the node. Additionally, or alternatively, as the route planning platform traverses the first set of nodes in this way (e.g., expanding forward from the origination point, only traversing nodes with a higher priority value), the route planning platform can determine, based on traversing at least one first particular node of the first set of nodes, that the at least one first particular node is included in the third set of nodes. The route planning platform can then also traverse, from the at least one first particular node, one or more of the third set of nodes based on a respective priority value associated with each node of the third set of nodes in a similar manner as described herein.

The route planning platform can continue to process in this way (e.g., for a node, determine one or more additional nodes that are connected to the node that have a higher priority value than the priority value of the node) to determine a first set of partial routes (e.g., where a partial route of the first set of partial routes represents a connection of one or more paths and/or shortcuts between the origination point and a node, of the first set of nodes and/or the third set of nodes, that has a higher priority value than the origination point) through the contraction hierarchy of the first partition and/or the contraction hierarchy of the third partition.

Additionally, or alternatively, the route planning platform can traverse, from the destination point, one or more nodes of the second set of nodes and/or the third set of nodes based on a respective priority value associated with each node of the second set of nodes and/or the third set of nodes in a similar manner as described herein. For example, the route planning platform can expand backward from the destination point (e.g., by only traversing nodes with a higher priority value) through the second set of nodes and/or the third set of nodes in a similar manner as described herein. As an additional example, as the route planning platform traverses the second set of nodes, the route planning platform can determine, based on traversing at least one second particular node of the second set of nodes, that the at least one second particular node is included in the third set of nodes. The route planning platform can then also traverse, from the at least one second particular node, one or more of the third set of nodes based on a respective priority value associated with each node of the third set of nodes in a similar manner as described herein. Accordingly, the route planning platform can determine a second set of partial routes (e.g., where a partial route of the second set of partial routes represents a connection of one or more paths and/or shortcuts between the destination point and a node, of the second set of nodes and/or the third set of nodes, that has a higher priority value than the origination point) through the contraction hierarchy of the second partition and/or the contraction hierarchy of the third partition.

In this way, the route planning platform can perform a bidirectional search (e.g., expand forward from the origination point and expand backward from the destination point, only traversing nodes with a higher priority value), in parallel, which reduces an overall amount of time to determine the first set of partial routes and the second set of partial routes.

In some implementations, the route planning platform can determine the route from the origination point to the destination point based on the first set of partial routes and/or the second set of partial routes. For example, for each partial route of the first set of partial routes, the route planning platform can determine whether at least one partial route of the second set of partial routes has a node, path, and/or shortcut in common with the partial route of the first set of partial routes (e.g., the partial route of the first set of partial routes meets the at least one partial route of the second set of partial routes). When the route planning platform determines that a partial route of the first set of partial routes meets a partial route of the second set of partial routes, the route planning platform combines (e.g., connects, links, and/or the like) the partial route of the first set of partial routes and the partial route of the second set of partial routes to form a potential route from the origination point to the destination point. In this way, the route planning platform can determine one or more potential routes from the origination point to the destination point.

Accordingly, the route planning platform can select the route from the one or more potential routes. For example, the route planning platform may analyze the one or more potential routes (e.g., by processing information associated with the one or more potential routes, such as a total distance, a total travel time, and/or the like of a potential route) to select an optimal route (e.g., a shortest distance route, a shortest travel time route, a route that avoids highways and/or residential areas, a route without tolls, and/or the like) from the origination point to the destination point. In this way, the route planning platform can determine the route from the origination point to the destination point based on traversing the first set of nodes, the second set of nodes, and the third set of nodes.

In some implementations, the origination point and the destination point can be in the same partition, so there is no need to traverse another partition and/or the overlay network. In such a case, the route planning platform can identify the partition associated with the origination point and the destination point in a similar manner as described herein in relation to FIG. 1E. The route planning platform can then determine a route from the origination point to the destination point in a similar manner as described herein in relation to FIG. 1F. For example, the route planning platform can identify a set of nodes of the contraction hierarchy of the partition (e.g., the interior nodes and/or the border nodes that are associated with the shortest routes between the border nodes of the contraction hierarchy of the partition). The route planning platform can traverse, from the origination point and/or the destination point, one or more nodes of the set of nodes based on a respective priority value associated with each node of the set of nodes to determine a set of routes through the contraction hierarchy of the partition. The route planning platform can then determine the route from the origination point to the destination point based on the set of routes. For example, the route planning platform can select an optimal route (e a shortest distance route, a shortest travel time route, a route that avoids highways and/or residential areas, a route without tolls, and/or the like) of the set of routes to determine the route from the origination point to the destination point.

Additionally, or alternatively, after the preprocessing stage described in association with FIGS. 1A-1D, the route planning platform can obtain update information concerning the road network. The update information can be related to one or more nodes, one or more paths, and/or the like of the road network. For example, the update information can concern closure of a road in the road network, an accident at an intersection in the road network, and/or the like. The route planning platform can identify a partition that includes the one or more nodes and/or the one or more paths, in a similar manner as described herein in relation to FIG. 1E, and can regenerate, based on the update information, the contraction hierarchy for the partition in a similar manner as described herein in relation to FIG. 1C. Additionally, or alternatively, the route planning platform can regenerate, based on the update information and/or the updated contraction hierarchy for the partition, the overlay network and/or the contraction hierarchy for the overlay network in a similar manner as described herein in relation to FIG. 1D. In this way, the route planning platform can update the contraction hierarchies for the partition and/or the overlay network without needing to update other contraction hierarchies. This enables the route planning platform to perform the update quickly and limits the amount of resources (processing resources, memory resources, power resources, and/or the like) the route planning platform uses to perform the update.

In some implementations, the route planning platform can selectively regenerate the overlay network and/or the contraction hierarchy for the overlay network. For example, the route planning platform can regenerate the overlay network and/or the contraction hierarchy based on determining a significant change, such as a closure of an entire highway, to the road network (e.g., based on processing the update information). As another example, the route planning platform can forgo regenerating the overlay network and/or the contraction hierarchy based on determining that an insignificant change, such as a closure of a local road, has occurred to the road network (e.g., based on processing the update information).

As indicated above, FIGS. 1A-1F are provided merely as examples. Other examples can differ from what is described with regard to FIGS. 1A-1F.

Figure 2:
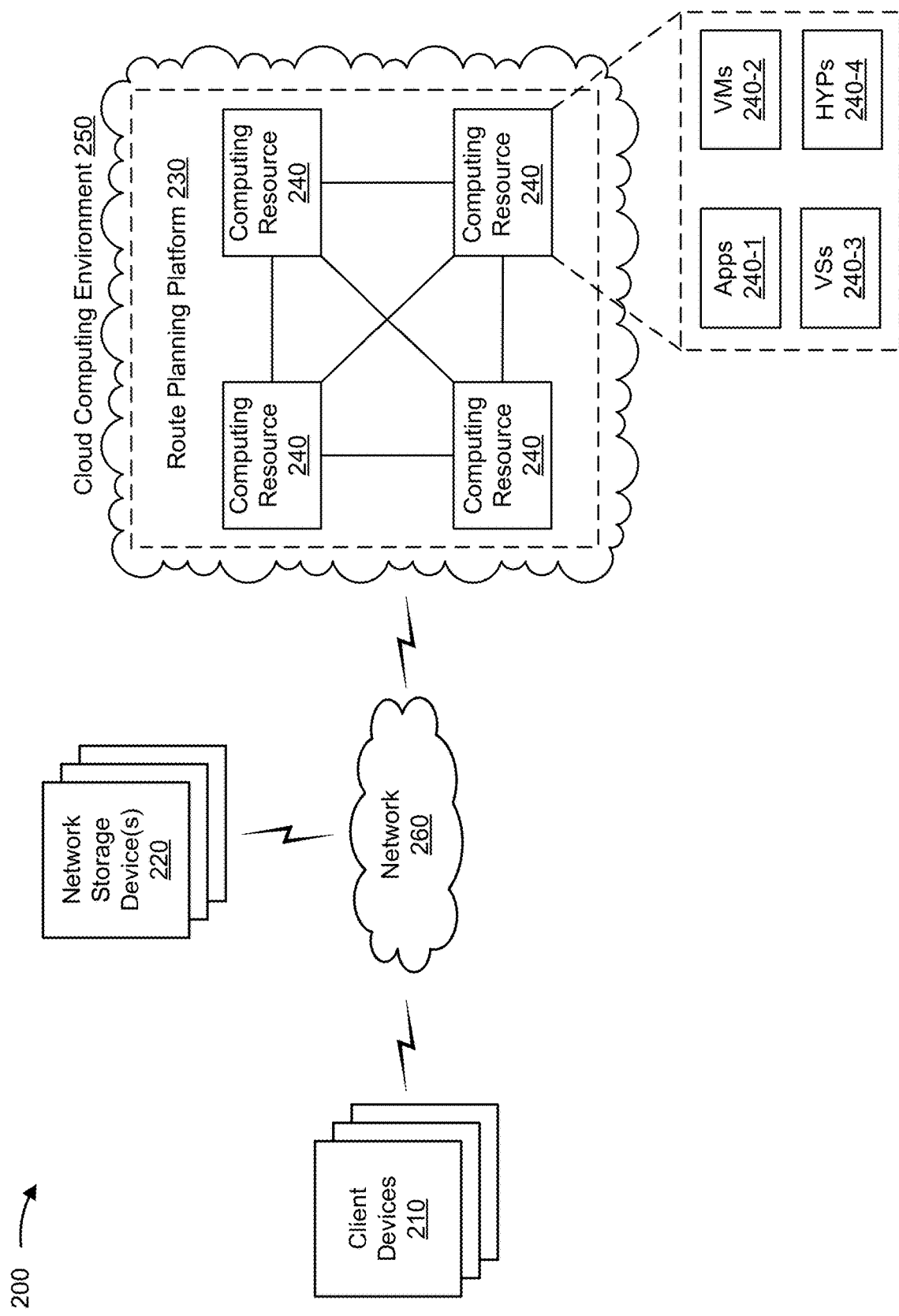
FIG. 2 is a diagram of an example environment in which systems and/or methods described herein can be implemented.

FIG. 2 is a diagram of an example environment 200 in which systems and/or methods described herein can be implemented. As shown in FIG. 2, environment 200 can include one or more client devices 210, one or more network storage devices 220, a route planning platform 230, one or more computing resources 240, a cloud computing environment 250, and/or a network 260. Devices of environment 200 can interconnect via wired connections, wireless connections, or a combination of wired and wireless connections.

Client device 210 includes one or more devices capable of receiving, generating, storing, processing, analyzing, and/or providing information, such as information described herein. For example, client device 210 can include a computer (e.g., a desktop computer, a laptop computer, a tablet computer, a handheld computer, a server device, etc.), a mobile phone (e.g., a smart phone, a radiotelephone, etc.), an internet of things (IoT) device or smart appliance, or a similar device. In some implementations, client device 210 can receive information from and/or transmit information to network storage device 220, route planning platform 230, and/or the like.

Network storage device 220 includes one or more devices capable of storing, processing, and/or routing information. Network storage device 220 can include, for example, a server device, a device that stores a database, a device in a cloud computing environment or a data center, a device in a core network of a network operator, a network controller, and/or the like. In some implementations, network storage device 220 can include a communication interface that allows network storage device 220 to receive information from and/or transmit information to other devices in environment 200, such as client device 210 and/or route planning platform 230.

Route planning platform 230 includes one or more computing resources 240. For example, route planning platform 230 can be a platform implemented by cloud computing environment 250. In some implementations, route planning platform 230 is implemented by computing resources 240 of cloud computing environment 250.

Route planning platform 230 can include one or more devices capable of dividing a road network into a plurality of partitions and generating a respective contraction hierarchy for each partition of the plurality of partitions. In some implementations, the route planning platform can generate an overlay network and/or a contraction hierarchy for the overlay network. In some implementations, the route planning platform can obtain information relating to an origination point and a destination point associated with the road network and can determine a route from the origination point to the destination point based on the respective contraction hierarchies of the plurality of partitions and the overlay network. In some implementations, route planning platform 230 can be hosted in cloud computing environment 250. Notably, while implementations described herein describe route planning platform 230 as being hosted in cloud computing environment 250, in some implementations, route planning platform 230 can be non-cloud-based or can be partially cloud-based.

Cloud computing environment 250 includes an environment that hosts route planning platform 230. Cloud computing environment 250 can provide computation, software, data access, storage, and/or other services that do not require end-user knowledge of a physical location and configuration of a system and/or a device that delivers the services. As shown, cloud computing environment 250 can include computing resources 240.

Computing resource 240 includes one or more personal computers, workstation computers, server devices, or another type of computation and/or communication device. In some implementations, computing resource 240 can host route planning platform 230. The cloud resources can include compute instances executing in computing resource 240, storage devices provided in computing resource 240, data transfer devices provided by computing resource 240, etc. In some implementations, computing resource 240 can communicate with other computing resources 240 via wired connections, wireless connections, or a combination of wired and wireless connections.

As further shown in FIG. 2, computing resource 240 can include a group of cloud resources, such as one or more applications ("APPs") 240-1, one or more virtual machines ("VMs") 240-2, virtualized storage ("VSs") 240-3, one or more hypervisors ("HYPs") 240-4, or the like.

Application 240-1 includes one or more software applications that can be provided to or accessed by client device 210, a network controller, one or more devices in a core network, and/or the like. Application 240-1 can eliminate a need to install and execute the software applications on such devices. For example, application 240-1 can include software associated with route planning platform 230 and/or any other software capable of being provided via cloud computing environment 250. In some implementations, one application 240-1 can send/receive information to/from one or more other applications 240-1, via virtual machine 240-2.

Virtual machine 240-2 includes a software implementation of a machine (e.g., a computer) that executes programs like a physical machine. Virtual machine 240-2 can be either a system virtual machine or a process virtual machine, depending upon use and degree of correspondence to any real machine by virtual machine 240-2. A system virtual machine can provide a complete system platform that supports execution of a complete operating system ("OS"). A process virtual machine can execute a single program, and can support a single process. In some implementations, virtual machine 240-2 can execute on behalf of another device, and can manage infrastructure of cloud computing environment 250, such as data management, synchronization, or long-duration data transfers.

Virtualized storage 240-3 includes one or more storage systems and/or one or more devices that use virtualization techniques within the storage systems or devices of computing resource 240. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 240-4 provides hardware virtualization techniques that allow multiple operating systems (e.g., "guest operating systems") to execute concurrently on a host computer, such as computing resource 240. Hypervisor 240-4 can present a virtual operating platform to the guest operating systems, and can manage the execution of the guest operating systems. Multiple instances of a variety of operating systems can share virtualized hardware resources.

Network 260 includes one or more wired and/or wireless networks. For example, network 260 can include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, a core network, and/or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
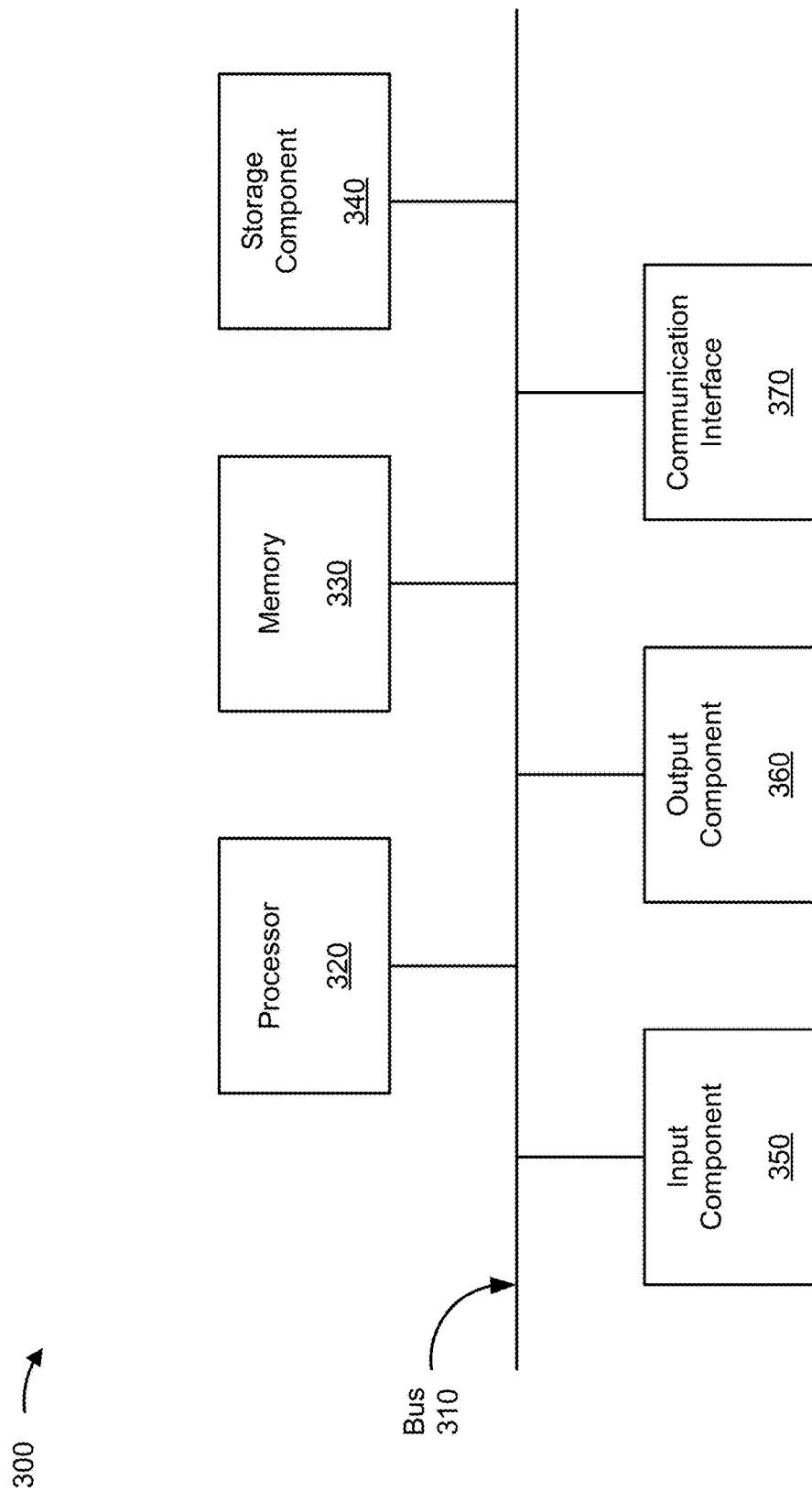
FIG. 3 is a diagram of example components of one or more devices of FIG. 2.

FIG. 3 is a diagram of example components of a device 300. Device 300 can correspond to client device 210, network storage device 220, route planning platform 230, computing resource 240, cloud computing environment 250, and/or the like. In some implementations client device 210, network storage device 220, route planning platform 230, computing resource 240, and/or cloud computing environment 250 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a wireless local area network interface, a cellular network interface, and/or the like.

Device 300 can perform one or more processes described herein. Device 300 can perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardware circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
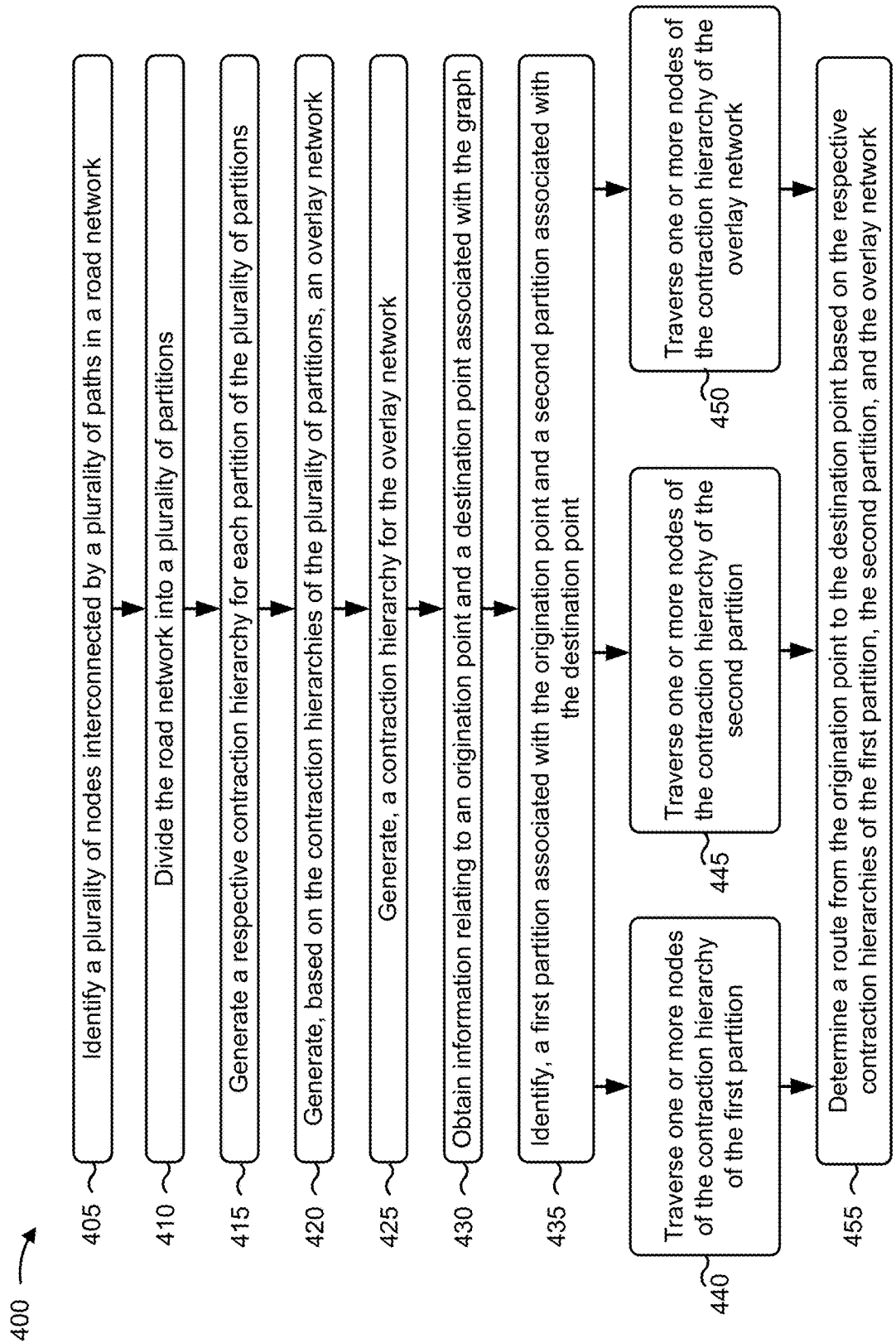
FIG. 4 is a flow chart of an example process for using partitioned contraction hierarchies to determine a route from an origination point to a destination point.

FIG. 4 is a flow chart of an example process 400 for using partitioned contraction hierarchies to determine a route from an origination point to a destination point. In some implementations, one or more process blocks of FIG. 4 can be performed by a route planning platform (e.g., route planning platform 230). In some implementations, one or more process blocks of FIG. 4 can be performed by another device or a group of devices separate from or including the route planning platform, such as client device 210, network storage device 220, computing resource 240, cloud computing environment 250, and/or the like.

As shown in FIG. 4, process 400 can include identifying a plurality of nodes interconnected by a plurality of paths in a road network (block 405). For example, the route planning platform (e.g., using computing resource 240, processor 320, memory 330, storage component 340, input component 350, output component 360, communication interface 370 and/or the like) can identify a plurality of nodes interconnected by a plurality of paths in a road network, as described above.

As further shown in FIG. 4, process 400 can include dividing the road network into a plurality of partitions (block 410). For example, the route planning platform (e.g., using computing resource 240, processor 320, memory 330, storage component 340, input component 350, output component 360, communication interface 370 and/or the like) can divide the road network into a plurality of partitions, as described above.

As further shown in FIG. 4, process 400 can include generating a respective contraction hierarchy for each partition of the plurality of partitions (block 415). For example, the route planning platform (e.g., using computing resource 240, processor 320, memory 330, storage component 340, input component 350, output component 360, communication interface 370 and/or the like) can generate a respective contraction hierarchy for each partition of the plurality of partitions, as described above.

As further shown in FIG. 4, process 400 can include generating, based on the contraction hierarchies of the plurality of partitions, an overlay network (block 420). For example, the route planning platform (e.g., using computing resource 240, processor 320, memory 330, storage component 340, input component 350, output component 360, communication interface 370 and/or the like) can generate, based on the contraction hierarchies of the plurality of partitions, an overlay network, as described above.

As further shown in FIG. 4, process 400 can include generating a contraction hierarchy for the overlay network (block 425). For example, the route planning platform (e.g., using computing resource 240, processor 320, memory 330, storage component 340, input component 350, output component 360, communication interface 370 and/or the like) can generate a contraction hierarchy for the overlay network, as described above.

As further shown in FIG. 4, process 400 can include obtaining information relating to an origination point and a destination point associated with the road network (block 430). For example, the route planning platform (e.g., using computing resource 240, processor 320, memory 330, storage component 340, input component 350, output component 360, communication interface 370 and/or the like) can obtain information relating to an origination point and a destination point associated with the road network, as described above.

As further shown in FIG. 4, process 400 can include identifying a first partition associated with the origination point and a second partition associated with the destination point (block 435). For example, the route planning platform (e.g., using computing resource 240, processor 320, memory 330, storage component 340, input component 350, output component 360, communication interface 370 and/or the like) can identify a first partition associated with the origination point and a second partition associated with the destination point, as described above.

As further shown in FIG. 4, process 400 can include traversing one or more nodes of the contraction hierarchy of the first partition (block 440). For example, the route planning platform (e.g., using computing resource 240, processor 320, memory 330, storage component 340, input component 350, output component 360, communication interface 370 and/or the like) can traverse one or more nodes of the contraction hierarchy of the first partition, as described above.

As further shown in FIG. 4, process 400 can include traversing one or more nodes of the contraction hierarchy of the second partition (block 445). For example, the route planning platform (e.g., using computing resource 240, processor 320, memory 330, storage component 340, input component 350, output component 360, communication interface 370 and/or the like) can traverse one or more nodes of the contraction hierarchy of the second partition, as described above.

As further shown in FIG. 4, process 400 can include traversing one or more nodes of the contraction hierarchy of the overlay network (block 450). For example, the route planning platform (e.g., using computing resource 240, processor 320, memory 330, storage component 340, input component 350, output component 360, communication interface 370 and/or the like) can traverse one or more nodes of the contraction hierarchy of the overlay network, as described above.

As further shown in FIG. 4, process 400 can include determining a route from the origination point to the destination point based on the respective contraction hierarchies of the first partition, the second partition, and the overlay network (block 455). For example, the route planning platform (e.g., using computing resource 240, processor 320, memory 330, storage component 340, input component 350, output component 360, communication interface 370 and/or the like) can determine a route from the origination point to the destination point based on the respective contraction hierarchies of the first partition, the second partition, and the overlay network, as described above.

Process 400 can include additional implementations, such as any single implementation or any combination of implementations described below and/or in connection with one or more other processes described elsewhere herein.

In a first implementation, dividing the road network into a plurality of partitions comprises determining a particular number of nodes to include in a partition and dividing the road network into the plurality of partitions.

In a second implementation, alone or in combination with the first implementation, generating the respective contraction hierarchy for each partition of the plurality of partitions comprises: identifying a border associated with the partition; identifying a group of paths, of the plurality of paths, and a group of nodes, of the plurality of nodes, that are included in the partition; generating a plurality of border nodes; calculating a respective shortest route between each border node of the plurality of border nodes; identifying a set of nodes, of the group of nodes, that are located along the shortest routes between the plurality of border nodes; determining a respective priority value of each node of the set of nodes; identifying a subset of nodes, of the set of nodes, causing the plurality of border nodes and the subset of nodes to be associated with a highest priority value for the partition. In some implementations, a border node, of the plurality of border nodes, represents a point at which a path, of the group of paths, intersects the border. In some implementations, each node of the subset of nodes is connected to a threshold number of paths.

In a third implementation, alone or in combination with any one or more of the first through second implementations, generating the overlay network comprises: generating the overlay network by combining the contraction hierarchies of the plurality of partitions. In a fourth implementation, alone or in combination with any one or more of the first through third implementations, generating the contraction hierarchy for the overlay network comprises: identifying one or more nodes of the overlay network and determining a respective priority value of each node of the one or more nodes of the overlay network.

In a fifth implementation, alone or in combination with any one or more of the first through fourth implementations, determining the route from the origination point to the destination point based on the respective contraction hierarchies of the first partition, the second partition, and the overlay network comprises: identifying a first set of nodes of the contraction hierarchy of the first partition, a second set of nodes of the contraction hierarchy of the second partition, and a third set of nodes of the contraction hierarchy of the overlay network; traversing, from the origination point, one or more of the first set of nodes and one or more of the third set of nodes based on a respective priority value associated with each node of the first set of nodes and the third set of nodes; determining, based on traversing the one or more of the first set of nodes and the one or more of third set of nodes, a first set of partial routes; traversing, from the destination point, one or more of the second set of nodes and one or more of the third set of nodes based on a respective priority value associated with each node of the second set of nodes the third set of nodes; determining, based on traversing the one or more of the second set of nodes and the one or more of third set of nodes, a second set of partial routes; and determining the route from the origination point to the destination point based on the first set of partial routes and the second set of partial routes.

In a sixth implementation, alone or in combination with any one or more of the first through fifth implementations, the route planning platform can obtain update information related to a particular node, of the plurality of nodes, or a particular path, of the plurality of paths, of the road network; identify a particular partition, of the plurality of partitions, that includes the particular node or the particular path; regenerate the contraction hierarchy for the particular partition; selectively regenerate, based on the contraction hierarchies of the plurality of partitions, the overlay network; and selectively regenerate the contraction hierarchy for the overlay network.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

The foregoing disclosure provides illustration and description, but is not intended to be exhaustive or to limit the implementations to the precise form disclosed. Modifications and variations can be made in light of the above disclosure or can be acquired from practice of the implementations.

As used herein, the term "component" is intended to be broadly construed as hardware, firmware, or a combination of hardware and software.

Some implementations are described herein in connection with thresholds. As used herein, satisfying a threshold can, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

Certain user interfaces have been described herein and/or shown in the figures. A user interface can include a graphical user interface, a non-graphical user interface, a text-based user interface, and/or the like. A user interface can provide information for display. In some implementations, a user can interact with the information, such as by providing input via an input component of a device that provides the user interface for display. In some implementations, a user interface can be configurable by a device and/or a user (e.g., a user can change the size of the user interface, information provided via the user interface, a position of information provided via the user interface, etc.). Additionally, or alternatively, a user interface can be pre-configured to a standard configuration, a specific configuration based on a type of device on which the user interface is displayed, and/or a set of configurations based on capabilities and/or specifications associated with a device on which the user interface is displayed.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein can be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features can be combined in ways not specifically recited in the claims and/or disclosed in the specification. Although each dependent claim listed below can directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   identifying, by a device, a plurality of nodes interconnected by a plurality of paths in a road network;
   dividing, by the device, the road network into a plurality of partitions,
      wherein each partition of the plurality of partitions includes:
         a group of nodes, of the plurality of nodes, and
         a group of paths, of the plurality of paths;
   generating, by the device, a plurality of contraction hierarchies for the plurality of partitions,
      wherein generating the plurality of contraction hierarchies for the plurality of partitions comprises:
         determining, by the device and for each partition of the plurality of partitions, a respective priority value of each node of the group of nodes based on respective quantities of paths that intersect each node of the group of nodes; and
         traversing, by the device and for each partition of the plurality of partitions, the group of nodes from lowest level priority value to highest level priority value;
   generating, by the device and based on the plurality of contraction hierarchies, an overlay network;
   generating, by the device and based on the overlay network, an overall contraction hierarchy for the overlay network;
   obtaining, by the device, information relating to an origination point and a destination point associated with the road network;
   identifying, by the device, a first partition, of the plurality of partitions, and a second partition, of the plurality of partitions,
      wherein the first partition is associated with the origination point and corresponds to a first contraction hierarchy, of the plurality of contraction hierarchies,
      wherein the second partition is associated with the destination point and corresponds to a second contraction hierarchy, of the plurality of contraction hierarchies, and
      wherein the first contraction hierarchy and the second contraction hierarchy are configured to be discretely regenerated based on update information relating to changes to the road network within the first partition or the second partition; and
   determining, by the device, a route from the origination point to the destination point based on the first contraction hierarchy, the second contraction hierarchy, and the overall contraction hierarchy.

2. The method of claim 1, wherein dividing the road network into the plurality of partitions comprises:
   determining a particular number of nodes to include in a partition, of the plurality of partitions; and
   dividing the road network into the plurality of partitions, wherein each partition, of the plurality of partitions, includes a number of nodes that matches the particular number of nodes within a threshold amount.

3. The method of claim 1, wherein generating the plurality of contraction hierarchies for the plurality of partitions further comprises:
   identifying a border associated with a partition, of the plurality of partitions;
   generating a plurality of border nodes;
      wherein a border node, of the plurality of border nodes, represents a point at which a path, of the group of paths, intersects the border;
   calculating a respective shortest route between each border node of the plurality of border nodes; and
   identifying a set of nodes, of the group of nodes, that are located along the shortest routes between the plurality of border nodes.

4. The method of claim 1, wherein generating the overlay network comprises:
   generating the overlay network by combining the plurality of contraction hierarchies.

5. The method of claim 1, wherein determining the route from the origination point to the destination point based on the first contraction hierarchy, the second contraction hierarchy, and the overall contraction hierarchy comprises:
   identifying a first set of nodes of the first contraction hierarchy, a second set of nodes of the second contraction hierarchy, and a third set of nodes of the overall contraction hierarchy;
   traversing, from the origination point, one or more of the first set of nodes and one or more of the third set of nodes;
   determining, based on traversing the one or more of the first set of nodes and the one or more of the third set of nodes, a first set of partial routes;
   traversing, from the destination point, one or more of the second set of nodes and one or more of the third set of nodes;
   determining, based on traversing the one or more of the second set of nodes and the one or more of the third set of nodes, a second set of partial routes; and
   determining the route from the origination point to the destination point based on the first set of partial routes and the second set of partial routes.

6. The method of claim 1, wherein the update information is first update information, and
   wherein the method further comprises:
      obtaining second update information related to a change to a particular node, of the plurality of nodes, or a particular path, of the plurality of paths, of the road network;
      determining that the first partition includes the particular node or the particular path; and
      regenerating only the first contraction hierarchy to account for the change to the particular node or the particular path.

7. The method of claim 6, further comprising:
forgoing regeneration of at least one of the overlay network or the overall contraction hierarchy based on a characteristic of the change to the particular node or the particular path.

8. A device, comprising:
one or more memories; and
one or more processors, communicatively coupled to the one or more memories, configured to:
identify a plurality of nodes interconnected by a plurality of paths in a road network;
divide the road network into a plurality of partitions,
wherein each partition of the plurality of partitions includes:
a group of nodes, of the plurality of nodes, and
a group of paths, of the plurality of paths;
generate a plurality of contraction hierarchies for the plurality of partitions,
wherein the one or more processors, when generating the plurality of contraction hierarchies for the plurality of partitions, are configured to:
determine, for each partition of the plurality of partitions, a respective priority value of each node of the group of nodes based on respective quantities of paths that intersect each node of the group of nodes; and
traverse, for each partition of the plurality of partitions, the group of nodes from lowest level priority value to highest level priority value;
generate, based on the plurality of contraction hierarchies, an overlay network;
generate, based on the overlay network, an overall contraction hierarchy for the overlay network;
obtain information relating to an origination point and a destination point associated with the road network;
identify a first partition, of the plurality of partitions, and a second partition, of the plurality of partitions,
wherein the first partition is associated with the origination point and corresponds to a first contraction hierarchy, of the plurality of contraction hierarchies,
wherein the second partition is associated with the destination point and corresponds to a second contraction hierarchy, of the plurality of contraction hierarchies, and
wherein the first contraction hierarchy and the second contraction hierarchy are configured to be discretely regenerated based on update information relating to changes to the road network within the first partition or the second partition; and
determine a route from the origination point to the destination point based on the first contraction hierarchy, the second contraction hierarchy, and the overall contraction hierarchy.

9. The device of claim 8, wherein the one or more processors, when dividing the road network into the plurality of partitions, are configured to:
determine a particular number of nodes to include in a partition, of the plurality of partitions; and
divide the road network into the plurality of partitions, wherein each partition, of the plurality of partitions, includes a number of nodes that matches the particular number of nodes within a threshold amount.

10. The device of claim 8, wherein the one or more processors, when generating the plurality of contraction hierarchies for the plurality of partitions, are further configured to:

identify a border associated with a partition, of the plurality of partitions;
generate a plurality of border nodes;
wherein a border node, of the plurality of border nodes, represents a point at which a path, of the group of paths, intersects the border;
calculate a respective shortest route between each border node of the plurality of border nodes; and
identify a set of nodes, of the group of nodes, that are located along the shortest routes between the plurality of border nodes.

11. The device of claim 8, wherein the one or more processors, when generating the overlay network, are configured to:
generate the overlay network by combining the plurality of contraction hierarchies.

12. The device of claim 8, wherein the one or more processors, when determining the route from the origination point to the destination point based on the first contraction hierarchy, the second contraction hierarchy, and the overall contraction hierarchy, are configured to:
identify a first set of nodes of the first contraction hierarchy, a second set of nodes of the second contraction hierarchy, and a third set of nodes of the overall contraction hierarchy;
traverse, from the origination point, one or more of the first set of nodes and one or more of the third set of nodes;
determine, based on traversing the one or more of the first set of nodes and the one or more of the third set of nodes, a first set of partial routes;
traverse, from the destination point, one or more of the second set of nodes and one or more of the third set of nodes;
determine, based on traversing the one or more of the second set of nodes and the one or more of the third set of nodes, a second set of partial routes; and
determine the route from the origination point to the destination point based on the first set of partial routes and the second set of partial routes.

13. The device of claim 8, wherein the update information is first update information, and
wherein the one or more processors are further configured to:
obtain second update information related to a change to a particular node, of the plurality of nodes, or a particular path, of the plurality of paths, of the road network;
determine that the second partition includes the particular node or the particular path;
regenerate the second contraction hierarchy to account for the change to the particular node or the particular path; and
selectively regenerate, based on regenerating the second contraction hierarchy, the overlay network and the overall contraction hierarchy.

14. The device of claim 8, wherein the update information is first update information, and
wherein the one or more processors are further configured to:
obtain second update information related to a change to a particular node, of the plurality of nodes, or a particular path, of the plurality of paths, of the road network;
determine that the second partition includes the particular node or the particular path;

regenerate the second contraction hierarchy to account for the change to the particular node or the particular path; and forgo regeneration of at least one of the overlay network or the overall contraction hierarchy based on a characteristic of the change to the particular node or the particular path.

15. A non-transitory computer-readable medium storing instructions, the instructions comprising:
one or more instructions that, when executed by one or more processors, cause the one or more processors to:
identify a plurality of nodes interconnected by a plurality of paths in a road network;
divide the road network into a plurality of partitions, wherein each partition of the plurality of partitions, includes:
a group of nodes, of the plurality of nodes, and
a group of paths, of the plurality of paths;
generate a plurality of contraction hierarchies for the plurality of partitions,
wherein the one or more instructions, that cause the one or more processors to generate the plurality of contraction hierarchies for the plurality of partitions, cause the one or more processors to:
determine, for each partition of the plurality of partitions, a respective priority value of each node of the group of nodes based on respective quantities of paths that intersect each node of the group of nodes; and
traverse, for each partition of the plurality of partitions, the group of nodes from lowest level priority value to highest level priority value;
generate, based on the plurality of contraction hierarchies, an overlay network;
generate, based on the overlay network, an overall contraction hierarchy for the overlay network;
obtain information relating to an origination point and a destination point associated with the road network;
identify a first partition, of the plurality of partitions, and a second partition, of the plurality of partitions,
wherein the first partition is associated with the origination point and corresponds to a first contraction hierarchy, of the plurality of contraction hierarchies,
wherein the second partition is associated with the destination point and corresponds to a second contraction hierarchy, of the plurality of contraction hierarchies, and
wherein the first contraction hierarchy and the second contraction hierarchy are configured to be discretely regenerated based on update information relating to changes to the road network within the first partition or the second partition; and
determine a route from the origination point to the destination point based on the first contraction hierarchy, the second contraction hierarchy, and the overall contraction hierarchy.

16. The non-transitory computer-readable medium of claim 15, wherein the one or more instructions, that cause the one or more processors to divide the road network into the plurality of partitions, cause the one or more processors to:
determine a particular number of nodes to include in a partition, of the plurality of partitions; and
divide the road network into the plurality of partitions, wherein each partition, of the plurality of partitions, includes a number of nodes that matches the particular number of nodes within a threshold amount.

17. The non-transitory computer-readable medium of claim 15, wherein the one or more instructions, that cause the one or more processors to generate the plurality of contraction hierarchies for the plurality of partitions, cause the one or more processors to:
identify a border associated with a partition, of the plurality of partitions;
generate a plurality of border nodes;
wherein a border node, of the plurality of border nodes, represents a point at which a path, of the group of paths, intersects the border;
calculate a respective shortest route between each border node of the plurality of border nodes; and
identify a set of nodes, of the group of nodes, that are located along the shortest routes between the plurality of border nodes.

18. The non-transitory computer-readable medium of claim 15, wherein the one or more instructions, that cause the one or more processors to generate the overlay network, cause the one or more processors to:
generate the overlay network by combining the plurality of contraction hierarchies.

19. The non-transitory computer-readable medium of claim 15, wherein the one or more instructions, that cause the one or more processors to determine the route from the origination point to the destination point based on the first contraction hierarchy, the second contraction hierarchy, and the overall contraction hierarchy, cause the one or more processors to:
identify a first set of nodes of the first contraction hierarchy, a second set of nodes of the second contraction hierarchy, and a third set of nodes of the overall contraction hierarchy;
traverse, from the origination point, one or more of the first set of nodes and one or more of the third set of nodes;
determine, based on traversing the one or more of the first set of nodes and the one or more of the third set of nodes, a first set of partial routes;
traverse, from the destination point, one or more of the second set of nodes and one or more of the third set of nodes;
determine, based on traversing the one or more of the second set of nodes and the one or more of the third set of nodes, a second set of partial routes; and
determine the route from the origination point to the destination point based on the first set of partial routes and the second set of partial routes.

20. The non-transitory computer-readable medium of claim 15, wherein the update information is first update information, and
wherein the one or more instructions, when executed by one or more processors, further cause the one or more processors to:
obtain second update information related to a change to a particular node, of the plurality of nodes, or a particular path, of the plurality of paths, of the road network;
determine that the second partition includes the particular node or the particular path;
regenerate the second contraction hierarchy to account for the change to the particular node or the particular path; and forgo regeneration of at least one of the overlay network or the overall contraction hierarchy based on a characteristic of the change to the particular node or the particular path.

\* \* \* \* \*